M. BIRKIGT.
LUBRICATION OF HELICAL WHEELS OR WORM GEARS.
APPLICATION FILED JAN. 4, 1916.
1,184,609. Patented May 23, 1916.
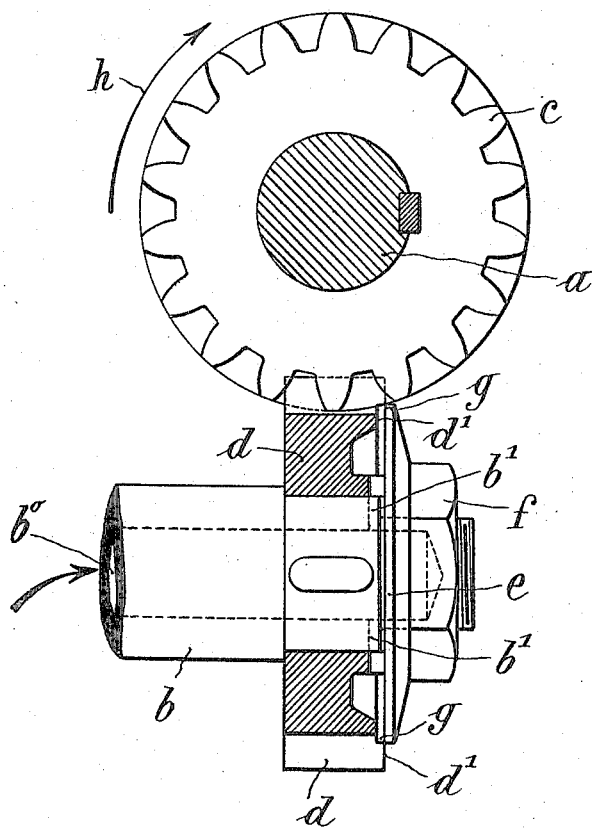

UNITED STATES PATENT OFFICE.

MARC BIRKIGT, OF BOIS-COLOMBES, FRANCE.

LUBRICATION OF HELICAL WHEELS OR WORM-GEARS.

1,184,609.  Specification of Letters Patent.  Patented May 23, 1916.

Application filed January 4, 1916.  Serial No. 70,256.

*To all whom it may concern:*

Be it known that I, MARC BIRKIGT, engineer, citizen of the Republic of Switzerland, residing at Bois-Colombes, Department of Seine, France, have invented certain new and useful Improvements in the Lubrication of Helical Wheels or Worm-Gears, of which the following is a specification.

This invention relates to the lubrication of helical wheels or worm gears.

The invention has for its object to so arrange gears that the lubrication of said gears takes place better and more simply than hitherto.

The invention comprises a helical wheel or worm gear having lubricant supplied under pressure to one of the elements of the gear through a central conduit provided in the shaft on which the element is mounted, in which the central conduit is connected to the bottom of the teeth of the element at that end which first comes into contact with any desired point of the other element.

The invention consists further in other arrangements which will be more fully described hereinafter.

The accompanying drawing shows, by way of example, a helical wheel gear according to this invention in axial section.

On the end of a driving shaft $a$ is arranged a helical wheel $c$ and on the end of a driven shaft $b$ is arranged a helical pinion $d$, the helical wheel $c$ engaging with the wheel $d$ at that face $d^1$ which is nearest to the end of the shaft on which the said pinion is mounted. A distribution of lubricant under pressure is provided for by bringing the lubricant into a central conduit $b^0$ formed in the shaft $b$ having one end closed as shown. The face $d^1$ of the pinion $d$ is recessed throughout the whole of the portion comprised between its central hole and a circumference of a diameter slightly larger than that of the circumference of the bottom of the teeth of the said pinion. The said recess is made so that its depth decreases toward its periphery and it has approximately the shape of a hollow truncated cone. In the shaft $b$ are provided radial holes $b^1$ so that when the pinion $d$ is put in place, the said holes $b^1$ open into the said recess. The recess is covered by a washer $e$ which is held in contact with the said face $d^1$ of the pinion $d$, for instance by means of a nut $f$, the said washer closing the said recess so that the lubricant arriving under pressure through the holes $b^1$, can escape only through the small passages $g$ into the bottom of the teeth of the pinion, between the inner face of the washer $e$ and the wall of the recess. In that way, the lubricant arriving under pressure through the conduit $b^0$, spurts through the small passages $g$ and as the toothed wheel $c$ rotates in the direction of the arrow $h$, the teeth of the said toothed wheel drive the lubricant and distribute it over the whole surface of the teeth of the pinion $d$, thus insuring perfect and ample lubrication.

Obviously, the invention is not limited to the construction described but comprises any modifications within the scope of the claims.

Having now particularly described and ascertained the nature of my said invention and in what manner the same is to be performed, I declare that what I claim is:—

1. Means for lubricating worm gears comprising a worm formed with a passage adapted to receive lubricant therein, said passage having communication with the threads of the worm at the point which first contacts with the other gear element.

2. Means for lubricating worm gears comprising a shaft formed with a conduit therein, a worm on said shaft having a recess formed in one side thereof, said recess having communication with the conduit of said shaft whereby lubricant is introduced in said recess, a cap in removable engagement with the recessed side of said worm and adapted to cover said recess, said worm being formed with a passage connecting said recess with the periphery of said worm at a point where the threads of said worm first engage successively with the other gear element.

3. Means for lubricating worm gears comprising a shaft formed with a bore therein, a worm on said shaft having one side thereof formed with an annular recess, said recess having communication with the bore of said shaft whereby lubricant is introduced into the recess, a disk removably mounted on the shaft and adapted to cover said annular recess whereby the lubricant is contained in the latter, said worm being formed with passages connecting said recess to the periphery of said worm at points where the threads of the worm first engage in succession the other gear element.

In testimony whereof I have hereunto set my hand in presence of two subscribing witnesses.

MARC BIRKIGT.

Witnesses:
CHAS. P. PRESSLY,
PAUL BLUM.

Copies of this patent may be obtained for five cents each, by addressing the "Commissioner of Patents, Washington, D. C."